United States Patent
Chen et al.

(10) Patent No.: US 7,682,594 B2
(45) Date of Patent: Mar. 23, 2010

(54) METHOD FOR PRODUCING PHOTOCATALYST

(75) Inventors: Yueh-Fang Chen, Taipei County (TW); Hsin-Yu Lin, Taichung County (TW); Yu-Wen Chen, Taoyuan County (TW)

(73) Assignee: National Central University, Taoyuan (TW)

( * ) Notice: Subject to any disclaimer, the term of this patent is extended or adjusted under 35 U.S.C. 154(b) by 834 days.

(21) Appl. No.: 11/309,092

(22) Filed: Jun. 21, 2006

(65) Prior Publication Data
US 2007/0297973 A1  Dec. 27, 2007

(51) Int. Cl.
*B01J 23/22* (2006.01)
*C01B 3/04* (2006.01)
*C01B 13/02* (2006.01)

(52) U.S. Cl. ............... 423/579; 423/658.2; 502/354

(58) Field of Classification Search .......... 502/337, 502/354; 423/658.2, 579
See application file for complete search history.

(56) References Cited

U.S. PATENT DOCUMENTS

| 4,332,650 | A | 6/1982 | Foh et al. ............ 205/338 |
| 4,391,680 | A | 7/1983 | Mani et al. ........... 205/344 |
| 6,726,893 | B2 | 4/2004 | Lee et al. ............ 423/658.2 |
| 6,838,413 | B2 | 1/2005 | Domen et al. .......... 502/216 |
| 7,553,464 | B2 * | 6/2009 | Kim et al. ............ 423/263 |
| 2005/0065371 | A1 * | 3/2005 | Petzoldt et al. ....... 562/546 |

OTHER PUBLICATIONS

Structural properties of InNbO4 and InTaO4: correlation with photocatalytic and photophysical properties by Zhigang Zou, Jinhua Ye, Hironori Arakawa. Dec. 22, 2000. Chemical Physics Letters 332 (2000) 271-277. www.elsevier.nl/locate/cplett.

Direct splitting of water under visible light irradiation with an oxide semiconductor photocatlyst by Zhigang Zou, Jihhua Ye, Kazuhiro Sayama & Hironori Arakawa. Nature, vol. 414, Dec. 6, 2001. www.nature.com.

A novel hydrogen-evolving photocatalyst InVO4 active under visible light irradiation by Jinhua Ye, Zhigang Zou, Mitsutake Oshikiri, Akiyuki Matsushita, Massahiko Shimoda, Motoharu Imai, Toetsu Shishido. Apr. 22, 2002. Chemical Physics Letters 356 (2002) 221-226. www.elsevier.com/locate/cplett.

A novel series of water splitting photocatalysts NiM2O6 (M=Nb, Ta) active under visible light by Jinhua Ye, Zhigang Zou, Akiyuki Matsushita. International Journal of Hydrogen Energy 28 (2003) 651-655.

H2 evolution from an aqueous methanol solution on SrTiO3 photocatalysts codoped with chromium and tantalum ions under visible light irradiation by Tatsuya Ishii, Hideki Kato, Akihiko Kudo. Journal of Photochemistry and Photobiology A: Chemistry 163 (2004) 181-186. www.elsevier.com/locate/jphotochem.

* cited by examiner

*Primary Examiner*—Wayne Langel
(74) *Attorney, Agent, or Firm*—Jianq Chyun IP Office (57) ABSTRACT

A method for preparing for a photocatalyst. The method comprises steps of providing a mixture of indium oxide and vanadium oxide and then calcining the mixture to obtain a indium vanadium quadrioxide. Further, a nickel nitrate solution is added to the indium vanadium quadrioxide to form a catalyst with a nickel oxide supported amount of about 0.1-2.0 wt. % and a post treatment is performed on the catalyst. In the post treatment, a reduction process is performed and then an oxidation process is performed.

16 Claims, 1 Drawing Sheet

Figure

METHOD FOR PRODUCING PHOTOCATALYST

BACKGROUND OF THE INVENTION

1. Field of Invention

The present invention relates to a method for producing catalysts. More particularly, the present invention relates to a method for producing photocatalyst for water splitting reaction.

2. Description of Related Art

Currently, there are many studies with respect to the semiconductor photocatalyst which is used to assist the dissociation of water for producing hydrogen and oxygen by being excited by sun light or visible light. The semiconductor photocalayst includes indium vanadium oxide, indium tantalum oxide, indium niobium oxide, strontium titanate etc. Zhingng Zou et al. disclosed an indium niobium oxide semiconductor catalyst made by solid reaction (Chem. Phys. Lett., volume 332, pages 271-277, 2000), wherein the amount of nickel-oxide cocatalyst was 0.5 weight percent (wt. %) and the hydrogen production amount, under 300 watt xenon lamp, was 3.5 μmol/hour-gcat. In addition, Zou et al., in Nature (volume 414, pages 625-627, 2001), disclosed an indium-tantalum oxide semiconductor catalyst prepared by using solid reaction, wherein the amount of nickel-oxide cocatalyst was 1 wt. % and the hydrogen production amount, under the 300 watt xenon lamp, was 3.2 μmol/hour-gcat. Furthermore, Ye et al., in Chem. Phys. Lett. (volume 356, pages 221-226, 2002), disclosed an indium vanadium oxide semiconductor catalyst formed by using solid reaction, wherein the amount of nickel-oxide cocatalyst was 1 wt. % and the hydrogen production amount, under the 300 watt xenon lamp, was 6.35 μmol/hour-gcat. Moreover, Ye et al., in International Journal of Hydrogen Energy (volume 28, pages 651-655, 2003), mentioned that the amount of platinum supported on $NiM_2O_6$ (M=Nb or Ta) was 0.1 wt. % and the hydrogen production amount, under the 400 Watt mercury lamp, was 360 μmol/hour-gcat. with respect to the use of the $NiNb_2O_6$ catalyst and 520 μmol/hour-gcat. with respect to the use of the $NiTa_2O_6$ catalyst. Kudo et al. disclosed that 1 wt. % platinum was loaded on the strontium titanate while chromium and tantalum were doped into the strontium titanate and the hydrogen production amount, under the 300 watt xenon lamp, was 70 μmol/hour-gcat., wherein the ratio of the doped chromium to the total catalyst and the ratio of the doped tantalum to the total catalyst were 4 mol % respectively.

In American patent with the U.S. Pat. No. 4,332,650, an electrothermal chemical process was used to dissociate water into hydrogen and oxygen. Also, in American patent with the U.S. Pat. No. 4,391,680, a water decomposition and electrolysis were used to prepare sodium hydroxide or potassium hydroxide. Furthermore, in American patent with the U.S. Pat. No. 6,726,893B2, a thin film device and a method for operating the thin film device were used to decompose water to produce hydrogen and oxygen. In another American patent with the U.S. Pat. No. 6,838,413B2, by the use of the oxysulfide semiconductor photocalayst modified with platinum, the water is decomposed to produce hydrogen. However, the hydrogen production amount by using the methods and the catalysts disclosed in all the documents and the issued patents is not high. How to increase the yield of hydrogen production becomes the main task in the field of photocatalysis.

SUMMARY OF THE INVENTION

Accordingly, at least one objective of the present invention is to provide a method for preparing of a photocatalyst. By using the photocatalyst from the present invention in the water splitting reaction, the hydrogen production amount is relatively high.

At least a second objective of the present invention is to provide a method of generating hydrogen and oxygen with the use of a nickel-oxide-supported indium vanadium oxide photocatalyst. Therefore, the hydrogen production amount is relatively high.

To achieve these and other advantages and in accordance with the purpose of the invention, as embodied and broadly described herein, the invention provides a method for preparing of a photocatalyst. The method comprises steps of providing a mixture of indium oxide and vanadium oxide and then calcining the mixture to obtain a indium vanadium oxide. Further, a nickel nitrate solution is added to the indium vanadium oxide to form a catalyst with a nickel oxide cocatalyst. The loading of nickel oxide is about 0.1-2.0 wt. % and a post treatment is performed on the catalyst. In the post treatment, a reduction process is performed and then an oxidation process is performed.

In the present invention, the step of calcining the mixture is performed for about 12-24 hours under 900-1200 centigrade. In addition, the preferable amount of nickel oxide is about 0.3-1.0 wt. %. Also, the step for forming the catalyst with the nickel oxide cocatalyst is accomplished by using incipient-wetness impregnation process. And, the step of adding the nickel nitrate solution onto the indium vanadium quadrioxide further comprises a step of heating and stirring a mixture of the indium vanadium oxide and the nickel nitrate solution by using a water bath in order to expel extra moisture. Moreover, the oxidation process is performed for 12-48 hours by using air under the room temperature to 300 centigrade. Alternatively, the reduction process is performed for 2-10 hours by using hydrogen under 400-650 centigrade. Furthermore, the oxidation process is performed for 1-48 hours by using oxygen under the room temperature to 300 centigrade.

The present invention further provides a method of generating hydrogen and oxygen. The method comprises steps of providing a photocatalyst. Notably, a method for forming the photocatalyst comprises steps of providing a mixture of indium oxide and vanadium oxide, calcining the mixture for about 12-24 hours under 900-1200 centigrade to obtain a indium vanadium oxide, adding a nickel nitrate solution to the indium vanadium oxide to form the photocatalyst with a nickel oxide cocatalyst amount of about 0.1-2.0 wt. % and then performing a post treatment on the photocatalyst, wherein a reduction process is performed for 2-10 hours by using hydrogen under 400-650 centigrade and then an oxidation process is performed. The method of generating hydrogen and oxygen further comprises steps of adding the photocatalyst into a water and then exciting a splitting reaction of the water by light to produce hydrogen and oxygen.

In the present invention, the preferable nickel oxide amount is about 0.3-1.0 wt. %. The step for forming the photocatalyst with the nickel oxide cocatalyst is accomplished by using incipient-wetness impregnation process. Also, the step of adding the nickel nitrate solution onto the indium vanadium oxide further comprises a step of heating and stirring a mixture of the indium vanadium oxide and the nickel nitrate solution by using a water bath in order to expel extra moisture. Then performing a post treatment on the photocatalyst, wherein a reduction process is performed for 2-10 hours by using hydrogen under 400-650 centigrade. In addition, the oxidation process is performed for 12-48 hours by using air under the room temperature to 300 centigrade. Alternatively, the oxidation process is performed for 1-48 hours by using oxygen under the room temperature to 300 centigrade. Moreover, a light source of the light includes a 500 watt halogen lamp and a reaction temperature of the water decomposition reaction is of about the room temperature to 60 centigrade.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIGURE is a plot diagram of the total amount of gas production versus NiO-loading on $InVO_4$.

DESCRIPTION OF THE PREFERRED EMBODIMENTS

Figure 1:
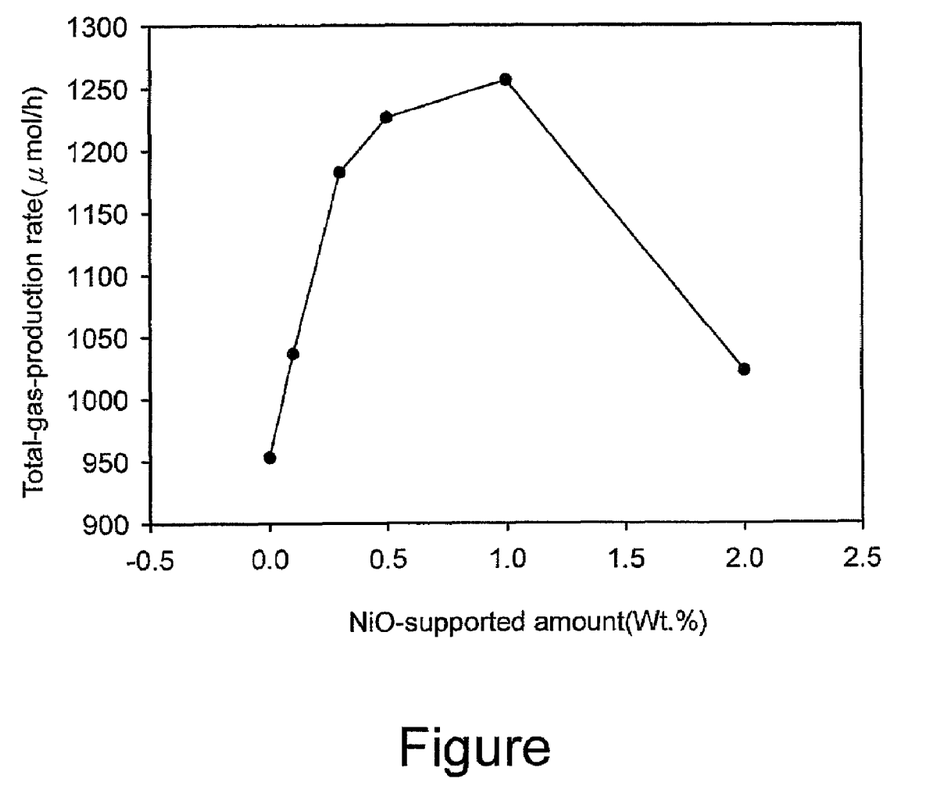

In the invention, indium vanadium oxide is produced by using solid reaction and then, with the use of the incipient-wetness impregnation process, the catalyst, $InVO_4$ with NiO supported, is prepared. By precisely controlling the preparation process, the hydrogen production yield is high under about room temperature to 58 centigrade. That is, the hydrogen production amount, under the 250 watt halogen lamp, is about 749.9 μmol/hour-gcat. when the amount of nickel-oxide-cocatalyst of the catalyst is about 0.3 wt. %.

First Embodiment

Indium oxide and vanadium oxide are mixed and grinded. Indium oxide is weighted about 2.7764 g (10 mmole) and vanadium oxide is weighted about 1.8188 g (10 mmole). The mixture of indium oxide and vanadium oxide is placed in an oven and is calcined for about 12-24 hours under 900-1200 centigrade. Preferably, the calcination is performed for about 12 hours under 1100 centigrade. After being cooled down to the room temperature, the mixture is transformed into the indium vanadium oxide.

Second Embodiment

Indium oxide and vanadium oxide are mixed and grinded. The indium oxide is weighted of about 2.7764 g (10 mmole) and the vanadium oxide is weighted of about 1.8188 g (10 mmole). The mixture of the indium oxide and the vanadium oxide is placed in an oven and is calcined for about 12-24 hours under 900-1200 centigrade. Preferably, the calcination is performed for about 12 hours under 1100 centigrade. After being cooled down to the room temperature, the mixture of the indium oxide and the vanadium oxide is converted into indium vanadium oxide. The indium vanadium oxide is placed in an oven. Further, by using the incipient-wetness impregnation process, the indium vanadium oxide is converted into a catalyst with nickel oxide supported. That is, nickel nitrate of about 0.0041 g is provided and is dissolved in 1.0500 ml water to be a nickel nitrate solution. Thereafter, the nickel nitrate solution is drop-by-drop added onto the indium vanadium oxide in the container and the mixture of the nickel nitrate solution and the indium vanadium oxide is stirred simultaneously. The mixture of the nickel nitrate solution and the indium vanadium oxide is heated by water bath with being properly stirred in order to expel the extra moisture within the indium vanadium oxide. Moreover, the mixture of the nickel nitrate solution and the indium vanadium oxide is calcined for about 1-6 hours under 200-500 centigrade to obtain NiO/InVO4 powder with the amount of nickel-oxide of about 0.1 wt. %. Preferably, the calcination is performed for about 2 hours under 300 centigrade.

Third Embodiment

Indium oxide and vanadium oxide are mixed and grinded. The indium oxide is weighted of about 2.7764 g (10 mmole) and the vanadium oxide is weighted of about 1.8188 g (10 mmole). The mixture of the indium oxide and the vanadium oxide is placed in an oven and is calcined for about 12-24 hours under 900-1200 centigrade. Preferably, the calcination is performed for about 12 hours under 1100 centigrade. After being cooled down to the room temperature, the mixture of the indium oxide and the vanadium oxide is converted into indium vanadium oxide. The indium vanadium oxide is placed into a container. Further, by using the incipient-wetness impregnation process, the indium vanadium oxide is converted into a catalyst with nickel oxide cocatalyst. That is, nickel nitrate of about 0.0123 g is provided and is dissolved in 1.0500 ml water to be a nickel nitrate solution. Thereafter, the nickel nitrate solution is drop-by-drop added onto the indium vanadium oxide in the container and the mixture of the nickel nitrate solution and the indium vanadium oxide is stirred simultaneously. The mixture of the nickel nitrate solution and the indium vanadium oxide is heated by water bath with being properly stirred in order to expel the extra moisture within the indium vanadium oxide. Moreover, the mixture of the nickel nitrate solution and the indium vanadium oxide is calcined for about 1-6 hours under 200-500 centigrade to obtain NiO/$InVO_4$ powder with the amount of nickel-oxide of about 0.3 wt. %. Preferably, the calcination is performed for about 2 hours under 300 centigrade.

Fourth Embodiment

Indium oxide and vanadium oxide are mixed and grinded. The indium oxide is weighted of about 2.7764 g (10 mmole) and the vanadium oxide is weighted of about 1.8188 g (10 mmole). The mixture of the indium oxide and the vanadium oxide is placed in an oven and is calcined for about 12-24 hours under 900-1200 centigrade. Preferably, the calcination is performed for about 12 hours under 1100 centigrade. After being cooled down to the room temperature, the mixture of the indium oxide and the vanadium oxide is converted into indium vanadium oxide. The indium vanadium oxide is placed into a container. Further, by using the incipient-wetness impregnation process, the indium vanadium oxide is converted into a catalyst with nickel oxide supported. That is, nickel nitrate of about 0.0204 g is provided and is dissolved in 1.0500 ml water to be a nickel nitrate solution. Thereafter, the nickel nitrate solution is drop-by-drop added onto the indium vanadium oxide in the container and the mixture of the nickel nitrate solution and the indium vanadium oxide is stirred simultaneously. The mixture of the nickel nitrate solution and the indium vanadium oxide is heated by water bath with being properly stirred in order to expel the extra moisture within the indium vanadium oxide. Moreover, the mixture of the nickel nitrate solution and the indium vanadium oxide is calcined for about 1-6 hours under 200-500 centigrade to obtain NiO/InVO$_4$ powder with the amount of nickel-oxide of about 0.5 wt. %. Preferably, the calcination is performed for about 2 hours under 300 centigrade.

Fifth Embodiment

Indium oxide and vanadium oxide are mixed and grinded. The indium oxide is weighted of about 2.7764 g (10 mmole) and the vanadium oxide is weighted of about 1.8188 g (10 mmole). The mixture of the indium oxide and the vanadium oxide is placed in an oven and is calcined for about 12-24 hours under 900-1200 centigrade. Preferably, the calcination is performed for about 12 hours under 1100 centigrade. After being cooled down to the room temperature, the mixture of the indium oxide and the vanadium oxide is converted into indium vanadium oxide. The indium vanadium oxide is placed into a container. Further, by using the incipient-wetness impregnation process, the indium vanadium oxide is converted into a catalyst with nickel oxide supported. That is, nickel nitrate of about 0.0409 g is provided and is dissolved in 1.0500 ml water to be a nickel nitrate solution. Thereafter, the nickel nitrate solution is drop-by-drop added onto the indium vanadium oxide in the container and the mixture of the nickel nitrate solution and the indium vanadium oxide is stirred simultaneously. The mixture of the nickel nitrate solution and the indium vanadium oxide is heated by water bath with being properly stirred in order to expel the extra moisture within the indium vanadium oxide. Moreover, the mixture of the nickel nitrate solution and the indium vanadium oxide is calcined for about 1-6 hours under 200-500 centigrade to obtain NiO/InVO$_4$ powder with the amount of nickel-oxide of about 1.0 wt. %. Preferably, the calcination is performed for about 2 hours under 300 centigrade.

Sixth Embodiment

Indium oxide and vanadium oxide are mixed and grinded. The indium oxide is weighted of about 2.7764 g (10 mmole) and the vanadium oxide is weighted of about 1.8188 g (10 mmole). The mixture of the indium oxide and the vanadium oxide is placed in an oven and is calcined for about 12-24 hours under 900-1200 centigrade. Preferably, the calcination is performed for about 12 hours under 1100 centigrade. After being cooled down to the room temperature, the mixture of the indium oxide and the vanadium oxide is converted into indium vanadium oxide. The indium vanadium oxide is placed into a container. Further, by using the incipient-wetness impregnation process, the indium vanadium oxide is converted into a catalyst with nickel oxide supported. That is, nickel nitrate of about 0.0818g is provided and is dissolved in 1.0500 ml water to be a nickel nitrate solution. Thereafter, the nickel nitrate solution is drop-by-drop added onto the indium vanadium oxide in the container and the mixture of the nickel nitrate solution and the indium vanadium oxide is stirred simultaneously. The mixture of the nickel nitrate solution and the indium vanadium oxide is heated by water bath with being properly stirred in order to expel the extra moisture within the indium vanadium oxide. Moreover, the mixture of the nickel nitrate solution and the indium vanadium oxide is calcined for about 1-6 hours under 200-500 centigrade to obtain NiO/InVO4 powder with the amount of nickel-oxide of about 2.0 wt. %. Preferably, the calcination is performed for about 2 hours under 300 centigrade.

Seventh Embodiment

Indium oxide and vanadium oxide are mixed and grinded. The indium oxide is weighted of about 2.7764 g (10 mmole) and the vanadium oxide is weighted of about 1.8188 g (10 mmole). The mixture of the indium oxide and the vanadium oxide is placed in an oven and is calcined for about 12-24 hours under 900-1200 centigrade. Preferably, the calcination is performed for about 12 hours under 1100 centigrade. After being cooled down to the room temperature, the mixture of the indium oxide and the vanadium oxide is converted into indium vanadium oxide. The indium vanadium oxide is placed into a container. Further, by using the incipient-wetness impregnation process, the indium vanadium oxide is converted into a catalyst with nickel oxide supported. That is, nickel nitrate of about 0.0041 g is provided and is dissolved in 1.0500 ml water to be a nickel nitrate solution. Thereafter, the nickel nitrate solution is drop-by-drop added onto the indium vanadium oxide in the container and the mixture of the nickel nitrate solution and the indium vanadium oxide is stirred simultaneously. The mixture of the nickel nitrate solution and the indium vanadium oxide is heated by water bath with being properly stirred in order to expel the extra moisture within the indium vanadium oxide. Moreover, the mixture of the nickel nitrate solution and the indium vanadium oxide is calcined for about 1-6 hours under 200-500 centigrade to obtain NiO/InVO4 powder with the amount of nickel-oxide of about 0.1 wt. %. Preferably, the calcination is performed for about 2 hours under 300 centigrade. Then, a post treatment including a reduction process and an oxidation process is performed. That is, the reduction process is performed on the NiO/InVO4 powder for 2-10 hours by using hydrogen under 400-650 centigrade and then the oxidation process is performed on the NiO/InVO4 powder for 1-48 hour by using oxygen under the room temperature (25 centigrade) to 300 centigrade. Preferably, the reduction process is performed for about 2 hours by using hydrogen under 500 centigrade and the oxidation process is performed for about 1 hour by oxygen under 250 centigrade. Therefore, photocatalyst with Ni-and-NiOx-surface contained is obtained, wherein the nickel-oxide content of the photocatalyst is of about 0.1 wt. %. Furthermore, the composition of the photocatalyst produced in this embodiment can be represented by NiO (0.1 wt. %)/InVO4 R500-O200.

Eighth Embodiment

Indium oxide and vanadium oxide are mixed and grinded. The indium oxide is weighted of about 2.7764 g (10 mmole) and the vanadium oxide is weighted of about 1.8188 g (10 mmole). The mixture of the indium oxide and the vanadium oxide is placed in an oven and is calcined for about 12-24 hours under 900-1200 centigrade. Preferably, the calcination is performed for about 12 hours under 1100 centigrade. After being cooled down to the room temperature, the mixture of the indium oxide and the vanadium oxide is converted into indium vanadium oxide. The indium vanadium oxide is placed into a container. Further, by using the incipient-wetness impregnation process, the indium vanadium oxide is converted into a catalyst with nickel oxide supported. That is, nickel nitrate of about 0.0123 g is provided and is dissolved in 1.0500 ml water to be a nickel nitrate solution. Thereafter, the nickel nitrate solution is drop-by-drop added onto the indium vanadium oxide in the container and the mixture of the nickel nitrate solution and the indium vanadium oxide is stirred simultaneously. The mixture of the nickel nitrate solution and the indium vanadium oxide is heated by water bath with being properly stirred in order to expel the extra moisture within the indium vanadium oxide. Moreover, the mixture of the nickel nitrate solution and the indium vanadium oxide is calcined for about 1-6 hours under 200-500 centigrade to obtain NiO/InVO4 powder with the amount of nickel-oxide of about 0.3 wt. %. Preferably, the calcination is performed for about 2 hours under 300 centigrade. Then, a post treatment including a reduction process and an oxidation process is performed. That is, the reduction process is performed on the NiO/InVO4 powder for 2-10 hours by using hydrogen under 400-650 centigrade and then the oxidation process is performed on the NiO/InVO4 powder for 1-48 hour by using oxygen under the room temperature (25 centigrade) to 300 centigrade. Preferably, the reduction process is performed for about 2 hours by using hydrogen under 500 centigrade and the oxidation process is performed for about 1 hour by oxygen under 250 centigrade. Therefore, photocatalyst with Ni-and-NiOx-surface contained is obtained, wherein the amount of nickel-oxide of the photocatalyst is of about 0.3 wt. %. Furthermore, the composition of the photocatalyst produced in this embodiment can be represented by NiO (0.3 wt. %)/InVO4 R500-O200.

Ninth Embodiment

Indium oxide and vanadium oxide are mixed and grinded. The indium oxide is weighted of about 2.7764 g (10 mmole) and the vanadium oxide is weighted of about 1.8188 g (10 mmole). The mixture of the indium oxide and the vanadium oxide is placed in an oven and is calcined for about 12-24 hours under 900-1200 centigrade. Preferably, the calcination is performed for about 12 hours under 1100 centigrade. After being cooled down to the room temperature, the mixture of the indium oxide and the vanadium oxide is converted into indium vanadium oxide. The indium vanadium oxide is placed into a container. Further, by using the incipient-wetness impregnation process, the indium vanadium oxide is converted into a catalyst with nickel oxide supported. That is, nickel nitrate of about 0.0204 g is provided and is dissolved in 1.0500 ml water to be a nickel nitrate solution. Thereafter, the nickel nitrate solution is drop-by-drop added onto the indium vanadium oxide in the container and the mixture of the nickel nitrate solution and the indium vanadium oxide is stirred simultaneously. The mixture of the nickel nitrate solution and the indium vanadium oxide is heated by water bath with being properly stirred in order to expel the extra moisture within the indium vanadium oxide. Moreover, the mixture of the nickel nitrate solution and the indium vanadium oxide is calcined for about 1-6 hours under 200-500 centigrade to obtain NiO/InVO4 powder with the amount of nickel oxide of about 0.5 wt. %. Preferably, the calcination is performed for about 2 hours under 300 centigrade. Then, a post treatment including a reduction process and an oxidation process is performed. That is, the reduction process is performed on the NiO/InVO4 powder for 2-10 hours by using hydrogen under 400-650 centigrade and then the oxidation process is performed on the NiO/InVO4 powder for 1-48 hour by using oxygen under the room temperature (25 centigrade) to 300 centigrade. Preferably, the reduction process is performed for about 2 hours by using hydrogen under 500 centigrade and the oxidation process is performed for about 1 hour by oxygen under 250 centigrade. Therefore, photocatalyst with Ni-and-NiOx-surface contained is obtained, wherein the amount of nickel-oxide of the photocatalyst is of about 0.5 wt. %. Furthermore, the composition of the photocatalyst produced in this embodiment can be represented by NiO (0.5 wt. %)/InVO4 R500-O200.

Tenth Embodiment

Indium oxide and vanadium oxide are mixed and grinded. The indium oxide is weighted of about 2.7764 g (10 mmole) and the vanadium oxide is weighted of about 1.8188 g (10 mmole). The mixture of the indium oxide and the vanadium oxide is placed in an oven and is calcined for about 12-24 hours under 900-1200 centigrade. Preferably, the calcination is performed for about 12 hours under 1100 centigrade. After being cooled down to the room temperature, the mixture of the indium oxide and the vanadium oxide is converted into indium vanadium oxide. The indium vanadium oxide is placed into a container. Further, by using the incipient-wetness impregnation process, the indium vanadium oxide is converted into a catalyst with nickel oxide supported. That is, nickel nitrate of about 0.0409 g is provided and is dissolved in 1.0500 ml water to be a nickel nitrate solution. Thereafter, the nickel nitrate solution is drop-by-drop added onto the indium vanadium oxide in the container and the mixture of the nickel nitrate solution and the indium vanadium oxide is stirred simultaneously. The mixture of the nickel nitrate solution and the indium vanadium oxide is heated by water bath with being properly stirred in order to expel the extra moisture within the indium vanadium oxide. Moreover, the mixture of the nickel nitrate solution and the indium vanadium oxide is calcined for about 1-6 hours under 200-500 centigrade to obtain NiO/InVO4 powder with nickel oxide content about 1.0 wt. %. Preferably, the calcination is performed for about 2 hours under 300 centigrade. Then, a post treatment including a reduction process and an oxidation process is performed. That is, the reduction process is performed on the NiO/InVO4 powder for 2-10 hours by using hydrogen under 400-650 centigrade and then the oxidation process is performed on the NiO/InVO4 powder for 1-48 hour by using oxygen under the room temperature (25 centigrade) to 300 centigrade. Preferably, the reduction process is performed for about 2 hours by using hydrogen under 500 centigrade and the oxidation process is performed for about 1 hour by oxygen under 250 centigrade. Therefore, photocatalyst with Ni-and-NiOx-surface contained is obtained, wherein the nickel-oxide supported amount of the photocatalyst is of about 1.0 wt. %. Furthermore, the composition of the photocatalyst produced in this embodiment can be represented by NiO (1.0 wt. %)/InVO4 R500-O200.

Eleventh Embodiment

Indium oxide and vanadium oxide are mixed and grinded. The indium oxide is weighted of about 2.7764 g (10 mmole) and the vanadium oxide is weighted of about 1.8188 g (10 mmole). The mixture of the indium oxide and the vanadium oxide is placed in an oven and is calcined for about 12-24 hours under 900-1200 centigrade. Preferably, the calcination is performed for about 12 hours under 1100 centigrade. After being cooled down to the room temperature, the mixture of the indium oxide and the vanadium oxide is converted into indium vanadium oxide. The indium vanadium oxide is placed into a container. Further, by using the incipient-wetness impregnation process, the indium vanadium oxide is converted into a catalyst with nickel oxide supported. That is, nickel nitrate of about 0.0409 g is provided and is dissolved in 1.0500 ml water to be a nickel nitrate solution. Thereafter, the nickel nitrate solution is drop-by-drop added onto the indium vanadium oxide in the container and the mixture of the nickel nitrate solution and the indium vanadium oxide is stirred simultaneously. The mixture of the nickel nitrate solution and the indium vanadium oxide is heated by water bath with being properly stirred in order to expel the extra moisture within the indium vanadium oxide. Moreover, the mixture of the nickel nitrate solution and the indium vanadium oxide is calcined for about 1-6 hours under 200-500 centigrade to obtain NiO/InVO4 powder with nickel oxide content about 1.0 wt. %. Preferably, the calcination is performed for about 2 hours under 300 centigrade. Then, a post treatment including a reduction process and an oxidation process is performed. That is, the reduction process is performed on the NiO/InVO4 powder for 2-10 hours by using hydrogen under 400-650 centigrade and then the oxidation process is performed on the NiO/InVO4 powder for 12-48 hour by using air under the room temperature (25 centigrade) to 300 centigrade. Preferably, the reduction process is performed for about 2 hours by using hydrogen under 500 centigrade and the oxidation process is performed for about 24 hour by air under the room temperature (25 centigrade). Therefore, photocatalyst with Ni-and-NiOx-surface contained is obtained, wherein the nickel-oxide content of the photocatalyst is of about 1.0 wt. %. Furthermore, the composition of the photocatalyst produced in this embodiment can be represented by NiO (1.0 wt. %)/InVO4 R500-O25.

Twelfth Embodiment

Indium oxide and vanadium oxide are mixed and grinded. The indium oxide is weighted of about 2.7764 g (10 mmole) and the vanadium oxide is weighted of about 1.8188 g (10 mmole). The mixture of the indium oxide and the vanadium oxide is placed in an oven and is calcined for about 12-24 hours under 900-1200 centigrade. Preferably, the calcination is performed for about 12 hours under 1100 centigrade. After being cooled down to the room temperature, the mixture of the indium oxide and the vanadium oxide is converted into indium vanadium oxide. The indium vanadium oxide is placed into a container. Further, by using the incipient-wetness impregnation process, the indium vanadium oxide is converted into a catalyst with nickel oxide supported. That is, nickel nitrate of about 0.0818 g is provided and is dissolved in 1.0500 ml water to be a nickel nitrate solution. Thereafter, the nickel nitrate solution is drop-by-drop added onto the indium vanadium oxide in the container and the mixture of the nickel nitrate solution and the indium vanadium oxide is stirred simultaneously. The mixture of the nickel nitrate solution and the indium vanadium oxide is heated by water bath with being properly stirred in order to expel the extra moisture within the indium vanadium oxide. Moreover, the mixture of the nickel nitrate solution and the indium vanadium oxide is calcined for about 1-6 hours under 200-500 centigrade to obtain NiO/InVO4 powder with nickel oxide content about 2.0 wt. %. Preferably, the calcination is performed for about 2 hours under300 centigrade. Then, a post treatment including a reduction process and an oxidation process is performed. That is, the reduction process is performed on the NiO/InVO4 powder for 2-10 hours by using hydrogen under 400-650 centigrade and then the oxidation process is performed on the NiO/InVO4 powder for 1-48 hour by using oxygen under the room temperature (25 centigrade) to 300 centigrade. Preferably, the reduction process is performed for about 2 hours by using hydrogen under 500 centigrade and the oxidation process is performed for about 1 hour by oxygen under 250 centigrade. Therefore, photocatalyst with Ni-and-NiOx-surface contained is obtained, wherein the nickel-oxide-supported amount of the photocatalyst is of about 2.0 wt. %. Furthermore, the composition of the photocatalyst produced in this embodiment can be represented by NiO (2.0 wt. %)/InVO4 R500-O200.

Thirteenth Embodiment

The catalyst, $InVO_4$, obtained in the first embodiment is placed in a reactor with 50 ml water. In order to expel the air in the reactor, nitrogen is pumped into the reactor for 12 min. Thereafter, the 500-Watt halogen lamp is turned on to excite the water splitting reaction while the time t is equal to zero (t=0). In addition, the gas product from the water splitting reaction under the reaction temperature of about the room temperature (25 centigrade) to 60 centigrade is collected every 10 min until the reaction time for the water decomposition reaction is about 2 hours. Thereafter, the halogen lamp is turned off to terminate the reaction and the reactor is cooled down to the room temperature. The collected gas products are analyzed by using gas chromatography, wherein the separation column with the length of about 3.5 m and the diameter of about 1/8 inches is made of stainless steel. Furthermore, the packing material in the separation column is a 5 A molecular sieve with a size of about 60 to 80. Hence, the analysis results are shown in following:

| Time (min) | Volume (ml) | Hydrogen production amount (mmole/g catalyst) | Oxygen production amount (mmole/g catalyst) |
|---|---|---|---|
| 10 | 3.4 | 662.7 | 331.4 |
| 20 | 4.4 | 857.6 | 428.8 |
| 30 | 6.1 | 1179.2 | 589.6 |
| 40 | 6.1 | 1179.2 | 589.6 |
| 50 | 6.1 | 1179.2 | 589.6 |
| 60 | 6.5 | 1266.9 | 633.5 |
| 70 | 6.5 | 1266.9 | 633.5 |
| 80 | 6.5 | 1266.9 | 633.5 |
| 90 | 6.5 | 1266.9 | 633.5 |
| 100 | 6.5 | 1266.9 | 633.5 |
| 110 | 6.5 | 1266.9 | 633.5 |
| 120 | 6.5 | 1266.9 | 633.5 |

Fourteenth Embodiment

The catalyst, $InVO_4$, obtained in the second embodiment is placed in a reactor with 50 ml water. In order to expel the air in the reactor, nitrogen is pumped into the reactor for 12 min. Thereafter, the 500-Watt halogen lamp is turned on to excite the water splitting reaction while the time t is equal to zero (t=0). In addition, the gas product from the water splitting reaction under the reaction temperature of about the room temperature (25 centigrade) to 60 centigrade is collected every 10 min until the reaction time for the water splitting reaction is about 2 hours. Thereafter, the halogen lamp is turned off to terminate the reaction and the reactor is cooled down to the room temperature. The collected gas products are analyzed by using gas chromatography, wherein the separation column with the length of about 3.5 m and the diameter of about 1/8 inches is made of stainless steel. Furthermore, the packing material in the separation column is a 5 A molecular sieve with a size of about 60 to 80. Hence, the analysis results are shown in following:

| Time (min) | Volume (ml) | Hydrogen production amount (mmole/g catalyst) | Oxygen production amount (mmole/g catalyst) |
| --- | --- | --- | --- |
| 10 | 3.6 | 699.2 | 349.6 |
| 20 | 5.2 | 1009.9 | 505.0 |
| 30 | 6.3 | 1223.6 | 611.8 |
| 40 | 6.3 | 1223.6 | 611.8 |
| 50 | 6.8 | 1320.7 | 660.3 |
| 60 | 6.9 | 1340.1 | 670.1 |
| 70 | 6.9 | 1340.1 | 670.1 |
| 80 | 7.1 | 1379.0 | 689.5 |
| 90 | 7.1 | 1379.0 | 689.5 |
| 100 | 7.3 | 1417.8 | 708.9 |
| 110 | 7.7 | 1495.5 | 747.7 |
| 120 | 7.7 | 1495.5 | 747.7 |

Fifteenth Embodiment

The catalyst, $InVO_4$, obtained in the third embodiment is placed in a reactor with 50 ml water. In order to expel the air in the reactor, nitrogen is pumped into the reactor for 12 min. Thereafter, the 500-Watt halogen lamp is turned on to excite the water decomposition reaction while the time t is equal to zero (t=0). In addition, the gas product from the water splitting reaction under the reaction temperature of about the room temperature (25 centigrade) to 60 centigrade is collected every 10 min until the reaction time for the water splitting reaction is about 2 hours. Thereafter, the halogen lamp is turned off to terminate the reaction and the reactor is cooled down to the room temperature. The collected gas products are analyzed by using gas chromatography, wherein the separation column with the length of about 3.5 m and the diameter of about ⅛ inches is made of stainless steel. Furthermore, the packing material in the separation column is a 5 A molecular sieve with a size of about 60 to 80. Hence, the analysis results are shown in following:

| Time (min) | Volume (ml) | Hydrogen production amount (mmole/g catalyst) | Oxygen production amount (mmole/g catalyst) |
| --- | --- | --- | --- |
| 10 | 4.1 | 789.6 | 399.3 |
| 20 | 6.0 | 1168.6 | 584.3 |
| 30 | 7.0 | 1363.4 | 681.7 |
| 40 | 7.0 | 1363.4 | 681.7 |
| 50 | 7.4 | 1441.3 | 720.2 |
| 60 | 7.5 | 1460.8 | 730.4 |
| 70 | 7.5 | 1460.8 | 730.4 |
| 80 | 7.5 | 1460.8 | 730.4 |
| 90 | 7.7 | 1499.8 | 749.9 |
| 100 | 7.7 | 1499.8 | 749.9 |
| 110 | 7.7 | 1499.8 | 749.9 |
| 120 | 7.7 | 1499.8 | 749.9 |

Sixteenth Embodiment

The catalyst, $InVO_4$, obtained in the fourth embodiment is placed in a reactor with 50 ml water. In order to expel the air in the reactor, nitrogen is pumped into the reactor for 12 min. Thereafter, the 500-Watt halogen lamp is turned on to excite the water splitting reaction while the time t is equal to zero (t=0). In addition, the gas product from the water decomposition reaction under the reaction temperature of about the room temperature (25 centigrade) to 58 centigrade is collected every 10 min until the reaction time for the water splitting reaction is about 2 hours. Thereafter, the halogen lamp is turned off to terminate the reaction and the reactor is cooled down to the room temperature. The collected gas products are analyzed by using gas chromatography, wherein the separation column with the length of about 3.5 m and the diameter of about ⅛ inches is made of stainless steel. Furthermore, the packing material in the separation column is a 5 A molecular sieve with a size of about 60 to 80. Hence, the analysis results are shown in following:

| Time (min) | Volume (ml) | Hydrogen production amount (mmole/g catalyst) | Oxygen production amount (mmole/g catalyst) |
| --- | --- | --- | --- |
| 10 | 3.2 | 623.3 | 311.6 |
| 20 | 6.2 | 1207.6 | 603.8 |
| 30 | 6.9 | 1343.9 | 672.0 |
| 40 | 7.1 | 1382.9 | 691.4 |
| 50 | 7.3 | 1412.1 | 706.1 |
| 60 | 7.3 | 1421.9 | 710.9 |
| 70 | 7.3 | 1421.9 | 710.9 |
| 80 | 7.4 | 1441.3 | 720.7 |
| 90 | 7.4 | 1441.3 | 720.7 |
| 100 | 7.4 | 1441.3 | 720.7 |
| 110 | 7.4 | 1441.3 | 720.7 |
| 120 | 7.5 | 1460.8 | 730.4 |

Seventeenth Embodiment

The catalyst, $InVO_4$, obtained in the fifth embodiment is placed in a reactor with 50 ml water. In order to expel the air in the reactor, nitrogen is pumped into the reactor for 12 min. Thereafter, the 500-Watt halogen lamp is turned on to excite the water splitting reaction while the time t is equal to zero (t=0). In addition, the gas product from the water splitting reaction under the reaction temperature of about the room temperature (25 centigrade) to 60 centigrade is collected every 10 min until the reaction time for the water decomposition reaction is about 2 hours. Thereafter, the halogen lamp is turned off to terminate the reaction and the reactor is cooled down to the room temperature. The collected gas products are analyzed by using gas chromatography, wherein the separation column with the length of about 3.5 m and the diameter of about ⅛ inches is made of stainless steel. Furthermore, the packing material in the separation column is a 5 A molecular sieve with a size of about 60 to 80. Hence, the analysis results are shown in following:

| Time (min) | Volume (ml) | Hydrogen production amount (mmole/g catalyst) | Oxygen production amount (mmole/g catalyst) |
| --- | --- | --- | --- |
| 10 | 3.5 | 681.2 | 340.6 |
| 20 | 5.0 | 973.2 | 486.6 |
| 30 | 5.5 | 1070.5 | 535.2 |
| 40 | 5.9 | 1148.3 | 574.2 |
| 50 | 6.1 | 1187.3 | 593.6 |
| 60 | 6.2 | 1206.7 | 603.4 |
| 70 | 6.3 | 1226.2 | 613.1 |
| 80 | 6.5 | 1265.1 | 632.6 |
| 90 | 6.7 | 1304.1 | 652.0 |
| 100 | 6.8 | 1323.5 | 661.8 |
| 110 | 7.0 | 1362.4 | 681.2 |
| 120 | 7.1 | 1381.9 | 691.0 |

Eighteenth Embodiment

The catalyst, InVO$_4$, obtained in the sixth embodiment is placed in a reactor with 50 ml water. In order to expel the air in the reactor, nitrogen is pumped into the reactor for 12 min. Thereafter, the 500-Watt halogen lamp is turned on to excite the water splitting reaction while the time t is equal to zero (t=0). In addition, the gas product from the water splitting reaction under the reaction temperature of about the room temperature (25 centigrade) to 60 centigrade is collected every 10 min until the reaction time for the water splitting reaction is about 2 hours. Thereafter, the halogen lamp is turned off to terminate the reaction and the reactor is cooled down to the room temperature. The collected gas products are analyzed by using gas chromatography, wherein the separation column with the length of about 3.5 m and the diameter of about 1/8 inches is made of stainless steel. Furthermore, the packing material in the separation column is a 5 A molecular sieve with a size of about 60 to 80. Hence, the analyzing results are shown in following:

| Time (min) | Volume (ml) | Hydrogen production amount (mmole/g catalyst) | Oxygen production amount (mmole/g catalyst) |
|---|---|---|---|
| 10 | 3.0 | 583.9 | 292.0 |
| 20 | 4.4 | 856.4 | 428.2 |
| 30 | 4.7 | 914.8 | 457.4 |
| 40 | 5.2 | 1002.4 | 501.2 |
| 50 | 5.2 | 1002.4 | 501.2 |
| 60 | 5.2 | 1012.1 | 506.1 |
| 70 | 5.3 | 1031.6 | 515.8 |
| 80 | 5.6 | 1090.0 | 545.0 |
| 90 | 5.6 | 1090.0 | 545.0 |
| 100 | 5.6 | 1090.0 | 545.0 |
| 110 | 5.7 | 1109.4 | 554.7 |
| 120 | 5.8 | 1128.9 | 564.4 |

Nineteenth Embodiment

The catalyst, InVO$_4$, obtained in the seventh embodiment is placed in a reactor with 50 ml water. In order to expel the air in the reactor, nitrogen is pumped into the reactor for 12 min. Thereafter, the 500-Watt halogen lamp is turned on to excite the water splitting reaction while the time t is equal to zero (t=0). In addition, the gas product from the water splitting reaction under the reaction temperature of about the room temperature (25 centigrade) to 60 centigrade is collected every 10 min until the reaction time for the water splitting reaction is about 2 hours. Thereafter, the halogen lamp is turned off to terminate the reaction and the reactor is cooled down to the room temperature. The collected gas products are analyzed by using gas chromatography, wherein the separation column with the length of about 3.5 m and the diameter of about 1/8 inches is made of stainless steel. Furthermore, the packing material in the separation column is a 5 A molecular sieve with a size of about 60 to 80. Hence, the analysis results are shown in following:

| Time (min) | Volume (ml) | Hydrogen production amount (mmole/g catalyst) | Oxygen production amount (mmole/g catalyst) |
|---|---|---|---|
| 10 | 3.6 | 699.2 | 349.6 |
| 20 | 5.2 | 1009.9 | 505.0 |
| 30 | 6.3 | 1223.6 | 611.8 |
| 40 | 6.3 | 1223.6 | 611.8 |
| 50 | 6.8 | 1320.7 | 660.3 |
| 60 | 6.9 | 1340.1 | 670.1 |
| 70 | 6.9 | 1340.1 | 670.1 |
| 80 | 7.1 | 1379.0 | 689.5 |
| 90 | 7.1 | 1379.0 | 689.5 |
| 100 | 7.3 | 1417.8 | 708.9 |
| 110 | 7.7 | 1495.5 | 747.7 |
| 120 | 7.7 | 1495.5 | 747.7 |

Twentieth Embodiment

The catalyst, InVO$_4$, obtained in the eighth embodiment is placed in a reactor with 50 ml water. In order to expel the air in the reactor, nitrogen is pumped into the reactor for 12 min. Thereafter, the 500-Watt halogen lamp is turned on to catalyze the water splitting reaction while the time t is equal to zero (t=0). In addition, the gas product from the water splitting reaction under the reaction temperature of about the room temperature (25 centigrade) to 60 centigrade is collected every 10 min until the reaction time for the water decomposition reaction is about 2 hours. Thereafter, the halogen lamp is turned off to terminate the reaction and the reactor is cooled down to the room temperature. The collected gas products are analyzed by using gas chromatography, wherein the separation column with the length of about 3.5 m and the diameter of about 1/8 inches is made of stainless steel. Furthermore, the packing material in the separation column is a 5 A molecular sieve with a size of about 60 to 80. Hence, the analysis results are shown in following:

| Time (min) | Volume (ml) | Hydrogen production amount (mmole/g catalyst) | Oxygen production amount (mmole/g catalyst) |
|---|---|---|---|
| 10 | 4.1 | 798.6 | 399.3 |
| 20 | 6.0 | 1168.6 | 584.3 |
| 30 | 7.0 | 1363.4 | 681.7 |
| 40 | 7.0 | 1363.4 | 681.7 |
| 50 | 7.4 | 1441.3 | 720.7 |
| 60 | 7.5 | 1460.8 | 730.4 |
| 70 | 7.5 | 1460.8 | 730.4 |
| 80 | 7.5 | 1460.8 | 730.4 |
| 90 | 7.7 | 1499.8 | 749.9 |
| 100 | 7.7 | 1499.8 | 749.9 |
| 110 | 7.7 | 1499.8 | 749.9 |
| 120 | 7.7 | 1499.8 | 749.9 |

Twenty-First Embodiment

The catalyst, InVO$_4$, obtained in the ninth embodiment is placed in a reactor with 50 ml water. In order to expel the air in the reactor, nitrogen is pumped into the reactor for 12 min. Thereafter, the 500-Watt halogen lamp is turned on to excite the water splitting reaction while the time t is equal to zero (t=0). In addition, the gas product from the water splitting reaction under the reaction temperature of about the room temperature (25 centigrade) to 60 centigrade is collected every 10 min until the reaction time for the water splitting reaction is about 2 hours. Thereafter, the halogen lamp is turned off to terminate the reaction and the reactor is cooled down to the room temperature. The collected gas products are analyzed by using gas chromatography, wherein the separation column with the length of about 3.5 m and the diameter of about ⅛ inches is made of stainless steel. Furthermore, the packing material in the separation column is a 5 A molecular sieve with a size of about 60 to 80. Hence, the analysis results are shown in following:

| Time (min) | Volume (ml) | Hydrogen production amount (mmole/g catalyst) | Oxygen production amount (mmole/g catalyst) |
|---|---|---|---|
| 10 | 4.2 | 817.5 | 408.7 |
| 20 | 6.5 | 1265.1 | 632.6 |
| 30 | 7.3 | 1420.8 | 710.4 |
| 40 | 7.8 | 1518.2 | 759.1 |
| 50 | 7.8 | 1518.2 | 759.1 |
| 60 | 8.0 | 1557.1 | 778.5 |
| 70 | 8.2 | 1596.0 | 798.0 |
| 80 | 8.2 | 1596.0 | 798.0 |
| 90 | 8.2 | 1596.0 | 798.0 |
| 100 | 8.4 | 1634.9 | 817.5 |
| 110 | 8.4 | 1634.9 | 817.5 |
| 120 | 8.4 | 1634.9 | 817.5 |

Twenty-Second Embodiment

The catalyst, $InVO_4$, obtained in the tenth embodiment is placed in a reactor with 50 ml water. In order to expel the air in the reactor, nitrogen is pumped into the reactor for 12 min. Thereafter, the 500-Watt halogen lamp is turned on to catalyze the water splitting reaction while the time t is equal to zero (t=0). In addition, the gas product from the water splitting reaction under the reaction temperature of about the room temperature (25 centigrade) to 60 centigrade is collected every 10 min until the reaction time for the water decomposition reaction is about 2 hours. Thereafter, the halogen lamp is turned off to terminate the reaction and the reactor is cooled down to the room temperature. The collected gas products are analyzed by using gas chromatography, wherein the separation column with the length of about 3.5 m and the diameter of about ⅛ inches is made of stainless steel. Furthermore, the packing material in the separation column is a 5 A molecular sieve with a size of about 60 to 80. Hence, the analysis results are shown in following:

| Time (min) | Volume (ml) | Hydrogen production amount (mmole/g catalyst) | Oxygen production amount (mmole/g catalyst) |
|---|---|---|---|
| 10 | 4.2 | 818.1 | 409.0 |
| 20 | 6.3 | 1227.1 | 613.5 |
| 30 | 7.0 | 1363.4 | 681.7 |
| 40 | 7.2 | 1402.4 | 701.2 |
| 50 | 7.5 | 1460.8 | 730.4 |
| 60 | 7.6 | 1480.3 | 740.1 |
| 70 | 7.9 | 1538.7 | 769.4 |
| 80 | 8.1 | 1571.8 | 785.9 |
| 90 | 8.1 | 1577.7 | 788.8 |
| 100 | 8.3 | 1616.6 | 808.3 |
| 110 | 8.4 | 1636.1 | 818.1 |
| 120 | 8.6 | 1675.1 | 837.5 |

Twenty-Third Embodiment

The catalyst, $InVO_4$, obtained in the eleventh embodiment is placed in a reactor with 50 ml water. In order to expel the air in the reactor, nitrogen is pumped into the reactor for 12 min. Thereafter, the 500-Watt halogen lamp is turned on to excite the water splitting reaction while the time t is equal to zero (t=0). In addition, the gas product from the water splitting reaction under the reaction temperature of about the room temperature (25 centigrade) to 60 centigrade is collected every 10 min until the reaction time for the water splitting reaction is about 2 hours. Thereafter, the halogen lamp is turned off to terminate the reaction and the reactor is cooled down to the room temperature. The collected gas products are analyzed by using gas chromatography, wherein the separation with the length of about 3.5 m and the diameter of about ⅛ inches is made of stainless steel. Furthermore, the packing material in the separation column is a 5 A molecular sieve with a size of about 60 to 80. Hence, the analysis results are shown in following:

| Time (min) | Volume (ml) | Hydrogen production amount (mmole/g catalyst) | Oxygen production amount (mmole/g catalyst) |
|---|---|---|---|
| 10 | 4.6 | 896.0 | 448.0 |
| 20 | 6.8 | 1324.5 | 662.2 |
| 30 | 8.0 | 1558.2 | 779.1 |
| 40 | 8.3 | 1616.6 | 808.3 |
| 50 | 8.3 | 1616.6 | 808.3 |
| 60 | 8.5 | 1655.6 | 827.8 |
| 70 | 8.7 | 1694.5 | 847.3 |
| 80 | 8.9 | 1733.5 | 866.7 |
| 90 | 8.96 | 1745.2 | 872.6 |
| 100 | 8.96 | 1745.2 | 872.6 |
| 110 | 8.96 | 1745.2 | 872.6 |
| 120 | 9.2 | 1791.9 | 896.0 |

Twenty-Fourth Embodiment

The catalyst, $InVO_4$, obtained in the twelfth embodiment is placed in a reactor with 50 ml water. In order to expel the air in the reactor, nitrogen is pumped into the reactor for 12 min. Thereafter, the 500-Watt halogen lamp is turned on to catalyze the water splitting reaction while the time t is equal to zero (t=0). In addition, the gas product from the water splitting reaction under the reaction temperature of about the room temperature (25 centigrade) to 60 centigrade is collected every 10 min until the reaction time for the water splitting reaction is about 2 hours. Thereafter, the halogen lamp is turned off to terminate the reaction and the reactor is cooled down to the room temperature. The collected gas products are analyzed by using gas chromatography, wherein the separation column with the length of about 3.5 m and the diameter of about ⅛ inches is made of stainless steel. Furthermore, the packing material in the separation column is a 5 A molecular sieve with a size of about 60 to 80. Hence, the analysis results are shown in following:

| Time (min) | Volume (ml) | Hydrogen production amount (mmole/g catalyst) | Oxygen production amount (mmole/g catalyst) |
|---|---|---|---|
| 10 | 3.9 | 759.6 | 379.8 |
| 20 | 5.3 | 1032.3 | 516.2 |
| 30 | 5.9 | 1149.2 | 574.6 |
| 40 | 6.0 | 1168.6 | 584.3 |
| 50 | 6.3 | 1227.1 | 613.5 |
| 60 | 6.4 | 1246.6 | 623.3 |
| 70 | 6.7 | 1305.0 | 652.5 |

-continued

| Time (min) | Volume (ml) | Hydrogen production amount (mmole/g catalyst) | Oxygen production amount (mmole/g catalyst) |
|---|---|---|---|
| 80 | 6.8 | 1314.7 | 657.4 |
| 90 | 6.8 | 1324.5 | 662.2 |
| 100 | 6.8 | 1324.5 | 662.2 |
| 110 | 7.0 | 1363.4 | 681.7 |
| 120 | 7.0 | 1363.4 | 681.7 |

Table 1 shows the total hydrogen production amount and the total oxygen production amount for each of the embodiments from the thirteenth embodiment to the twenty-fourth embodiment.

TABLE 1

| Embodiment | Reaction time | Hydrogen production amount (mmole/g catalyst) | Oxygen production amount (mmole/g catalyst) |
|---|---|---|---|
| 13 | 120 | 635.3 | 317.6 |
| 14 | 120 | 747.7 | 373.9 |
| 15 | 120 | 749.9 | 374.9 |
| 16 | 120 | 730.4 | 365.2 |
| 17 | 120 | 691.0 | 345.5 |
| 18 | 120 | 564.4 | 282.2 |
| 19 | 120 | 691.0 | 345.5 |
| 20 | 120 | 788.3 | 394.1 |
| 21 | 120 | 817.5 | 408.7 |
| 22 | 120 | 837.5 | 418.8 |
| 23 | 120 | 896.0 | 448.0 |
| 24 | 120 | 681.7 | 340.9 |

By comparing the total hydrogen production amount between the twenty-second embodiment and the twenty-third embodiment, it is obvious that the hydrogen production amount of the twenty-third embodiment with using the catalyst obtained from the eleventh embodiment is relatively high, wherein the catalyst is prepared by the use of the post treatment having the oxidation process under the room temperature (25 centigrade). That is, the use of the catalyst prepared by using the post treatment having the oxidation process performed by using air under the room temperature can more effectively produce hydrogen and further increase the hydrogen production amount than the use of the catalyst formed by using the post treatment having the oxidation process performed by using oxygen under relatively high oxidation temperature.

Furthermore, FIGURE is a plot diagram of the total-gas-production rate versus NiO-content of the $InVO_4$, wherein the catalyst, $InVO_4$ with NiO loaded, is prepared by using the post treatment with the oxidation performed by using oxygen under relatively high oxidation temperature. It is clear that the total gas production rate is relatively high when the NiO-supported amount of the $InVO_4$ is of about 0.3-1 wt. %.

It will be apparent to those skilled in the art that various modifications and variations can be made to the structure of the present invention without departing from the scope or spirit of the invention. In view of the foregoing descriptions, it is intended that the present invention covers modifications and variations of this invention if they fall within the scope of the following claims and their equivalents.

What is claimed is:

1. A method for preparing a photocatalyst, comprising:
providing a mixture of indium oxide and vanadium oxide;
calcining the mixture to obtain an indium vanadium quadrioxide;
adding a nickel nitrate solution to the indium vanadium quadrioxide to form a catalyst with a nickel oxide supported amount of about 0.1-2.0 wt. %; and
performing a post treatment on the catalyst, wherein a reduction process is performed as said post treatment and then an oxidation process is performed.

2. The method of claim 1, wherein the step of calcining the mixture is performed for about 12-24 hours at 900-1200 centigrade.

3. The method of claim 1, wherein the amount of nickel oxide is about 0.3-1.0 wt. %.

4. The method of claim 1, wherein the oxidation process is performed for 12-48 hours by using air at room temperature to 300 centigrade.

5. The method of claim 1, wherein the oxidation process is performed for 1-48 hours by using oxygen at room temperature to 300 centigrade.

6. The method of claim 1, wherein the reduction process is performed for 2-10 hours by using hydrogen at 400-650 centigrade.

7. The method of claim 1, wherein the step for adding the nickel nitrate solution to the indium vanadium quadrioxide to form the catalyst with the nickel oxide includes an incipient-wetness impregnation process.

8. The method of claim 1, wherein the step of adding the nickel nitrate solution to the indium vanadium quadrioxide further comprises a step of heating and stirring a mixture of the indium vanadium quadrioxide and the nickel nitrate solution by using a water bath to expel extra moisture.

9. A method of producing hydrogen and oxygen, comprising:
forming a photocatalyst, wherein the photocatalyst is formed by:
providing a mixture of indium oxide and vanadium oxide;
calcining the mixture for about 12-24 hours at 900-1200 centigrade to obtain an indium vanadium quadrioxide;
adding a nickel nitrate solution to the indium vanadium oxide to form the photocatalyst with an amount of nickel oxide cocatalyst of about 0.1-2.0 wt. %; and
performing a post treatment on the photocatalyst, wherein a reduction process is performed for 2-10 hours by using hydrogen at 400-650 centigrade and then an oxidation process is performed as said post treatment;
adding the photocatalyst into water; and
using said photocatalyst to catalyze a water splitting reaction by light to produce hydrogen and oxygen.

10. The method of claim 9, wherein the amount of nickel oxide cocatalyst is about 0.3-1.0 wt. %.

11. The method of claim 9, wherein the oxidation process is performed for 12-48 hours by using air at room temperature to 300 centigrade.

12. The method of claim 9, wherein the oxidation process is performed for 1-48 hours by using oxygen at room temperature to 300 centigrade.

13. The method of claim 9, wherein the step for forming the photocatalyst with the nickel oxide includes an incipient-wetness impregnation process.

14. The method of claim 9, wherein the step of adding the nickel nitrate solution the indium vanadium quadrioxide further comprises a step of heating and stirring a mixture of the indium vanadium quadrioxide and the nickel nitrate solution by using a water bath to expel extra moisture.

15. The method of claim 9, wherein a light source of the light includes a 500 Watt halogen lamp.

16. The method of claim 9, wherein a reaction temperature for the water splitting reaction is room temperature to 60 centigrade.

* * * * *